United States Patent [19]
Toll

[11] Patent Number: 4,630,864
[45] Date of Patent: Dec. 23, 1986

[54] AIRCRAFT SEATS
[75] Inventor: Ian C. Toll, Poole, England
[73] Assignee: Futaire Limited, Poole, England
[21] Appl. No.: 751,051
[22] PCT Filed: Nov. 23, 1984
[86] PCT No.: PCT/GB84/00403
 § 371 Date: Jul. 2, 1985
 § 102(e) Date: Jul. 2, 1985
[87] PCT Pub. No.: WO85/02384
 PCT Pub. Date: Jun. 6, 1985
[30] Foreign Application Priority Data
 Nov. 23, 1983 [GB] United Kingdom ............... 8331260
[51] Int. Cl.[4] .................... A47C 3/00; B64D 11/06
[52] U.S. Cl. .................................. 297/232; 297/445; 297/452
[58] Field of Search ............. 297/232, 248, 445, 452, 297/454, DIG. 2; 248/188.8
[56] References Cited
U.S. PATENT DOCUMENTS
3,091,497 5/1963 Houser ........................... 297/452 X
3,111,344 11/1963 Hoven et al. ..................... 297/445
3,468,582 9/1969 Judd ............................. 297/248 X
4,296,967 10/1981 Vogel ........................... 297/452 X
4,375,300 3/1983 Long et al. ...................... 297/232
4,526,421 7/1985 Brennan et al. ................... 297/232
4,529,247 7/1985 Stumpf et al. .................... 297/301

FOREIGN PATENT DOCUMENTS
2360441 4/1978 France ........................... 297/232

Primary Examiner—Kenneth J. Dorner
Assistant Examiner—Peter R. Brown
Attorney, Agent, or Firm—Shoemaker and Mattare, Ltd.

[57] ABSTRACT

A lightweight aircraft seat based on resin preimpregnated carbon fibre comprises a bluff rectangular spar (20) integrally secured to J-tubes (26) and a diaphragm (31) spanning between the J-tubes. The spar (20) is located in a recess (16) in a leg (22) of I-section also of carbon fibre. A curvilinar front portion (24) of the seat of core and skin construction and of constant profile is cantilevered forwardly and upwardly from the spar (20). The J-tubes (26) are formed with attachment points (27), (28), (30) for seat belts, a seat back (41) and armrests.

13 Claims, 4 Drawing Figures

AIRCRAFT SEATS

FIELD OF THE INVENTION

The present invention relates to an improved aircraft seat.

BACKGROUND TO THE INVENTION

A single spar aircraft seat frame is described in specification No. GB-A 2022403 and employs a single laterally extending spar secured to the apex of leg subframes and in turn carrying arm-rest frames. Seat pad supports of webbing are resiliently suspended between the arm-rest frames by coil springs and wire hangers. But insofar as the lateral spar is positioned below the arm-rest frames it obstructs the free space of the passenger immediately to the rear. And in the event of a heavy down load, the occupant's legs may come into contact with and be fractured by the laterally extending spar. Moreover the seat frame is made from metal and is inherently heavier than when carbon fibre reinforced plastics materials and aramid materials are used, e.g. as described in our Patent Specification No. WO-82/03366.

SUMMARY OF THE INVENTION

It is an object of the invention to provide a lightweight aircraft seat frame construction using carbon fibre and aramid materials that is inherently safe in heavy down load situations, is free from risk of passenger forward load shin impact and can be used for high density (26-27 inch or 66-69 cms pitch) seat accommodation.

The invention comprises a combined seat frame and cushion support for an aircraft seat comprising a single laterally extending spar of non-circular cross-section presenting a bluff upper surface and formed from a core of expanded material and a skin of carbon fibre reinforced plastics, a plurality of seat supports of fibre reinforced plastics material secured to the spar at laterally spaced locations, a seat cushion support diaphragm on and spanning between the seat supports and the spar and of profile defined by the seat supports, and one or more legs of inverted U-shaped side profile each leg being formed at its apex with a recess in which the spar is located and rigidly secured.

The invention also provides a combined seat frame and cushion support for an aircraft seat comprising an integrally moulded structure in carbon fibre including a spar presenting a flat upper surface, rearwardly facing J-shaped seat supports secured to the spar at laterally spaced locations, a diaphragm spanning between the seat supports to define an uninterrupted top surface with the spar and cantilevered from the spar to deform elastically in response to the normal weight of an occupant and to undergo progressive inelastic deformation with energy absorption in response to a heavy down load, and a front portion of curvilinear profile cantilevered forwardly and upwardly from the spar with which it also defines an uninterrupted top surface and terminated in a downwardly curved nose. Said front portion also undergoing progressive inelastic deformation with energy absorption in response to a heavy down load.

The term "carbon fibre reinforced plastics" includes plastics materials reinforced additionally with glass or Kevlar (polyimide) fibres, the carbon fibres predominating.

BRIEF DESCRIPTION OF DRAWINGS

An embodiment of the invention will now be described, by way of example only, with reference to the accompanying drawings, in which.

DETAILED DESCRIPTION OF PREFERRED EMBODIMENT

Figure 1:
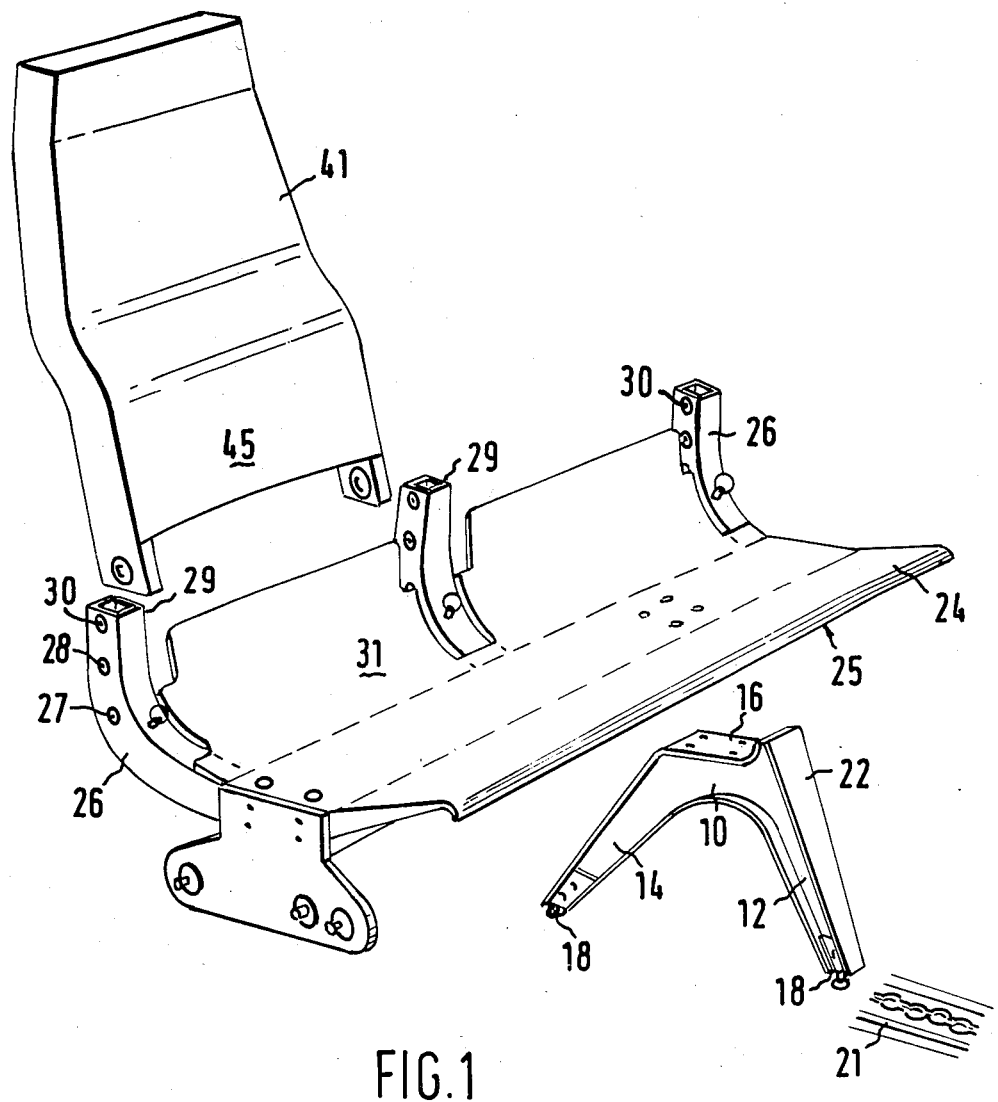
FIG. 1 is a perspective view of a two place seat for an aircraft.
Figure 2:
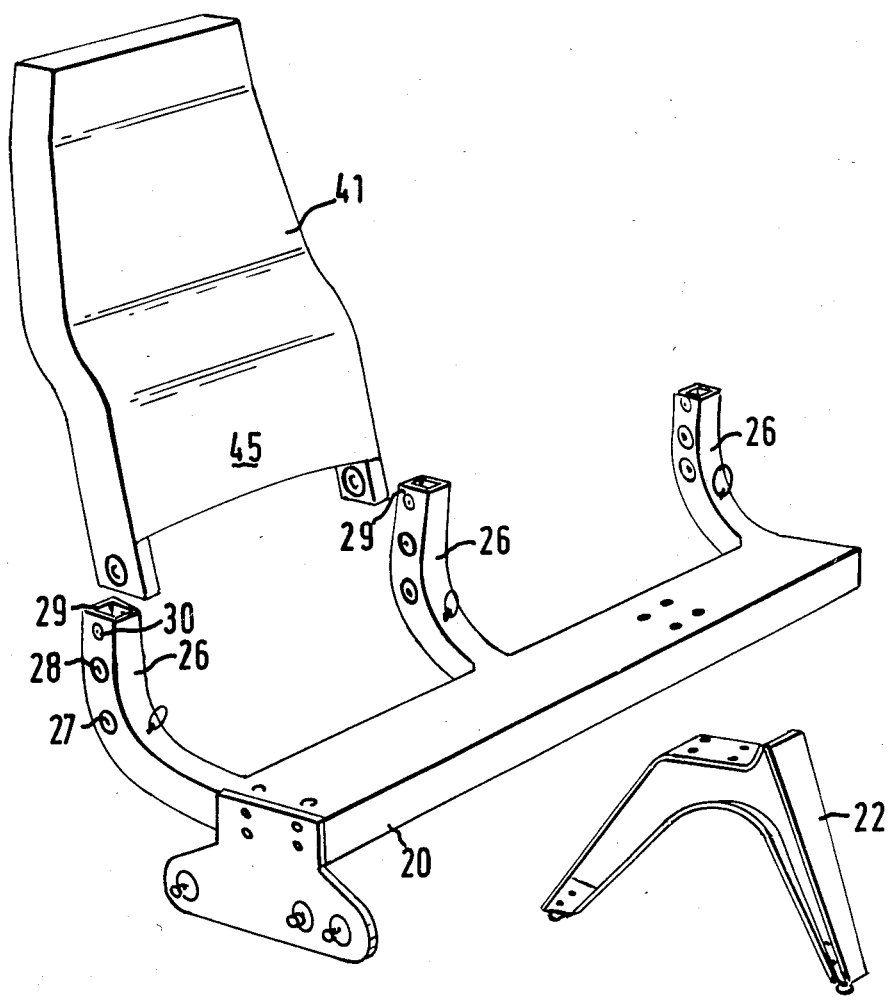
FIG. 2 is a view of the seat with the front portion and diaphragm removed to show the main load-bearing structure.

As illustrated in FIGS. 1 and 2 the seat frame comprises a laterally extending spar 20 in the form of a generally rectangular member presenting a flat upper surface and having a core of acrylic or polyimide structural foam (or aluminium or Nomex honeycomb) filling a hollow skin of carbon fibre reinforced plastics. The spar 20 is of constant section throughout its length and is supported by a leg assembly 22 which is adapted to be secured to an aircraft floor which is normally provided with fixing tracks 21 for this purpose. In the multi-person version of the seat there are defined laterally spaced seat supports 26 that extend from behind the spar 20. The seat supports 26 are of generally J-profile and are also of a hollow carbon fibre reinforced plastics skin filled with a structural foam or honeycomb core. The rear portions of the supports 26 are curved upwardly, are provided with seat belt anchorage points 27 and backrest fixing points 28 and terminate in upwardly directed stub posts 29 provided with arm rest fixing points 30. Each fixing point is defined by a metal sleeve between opposed side faces of the support 26.

Figure 4:
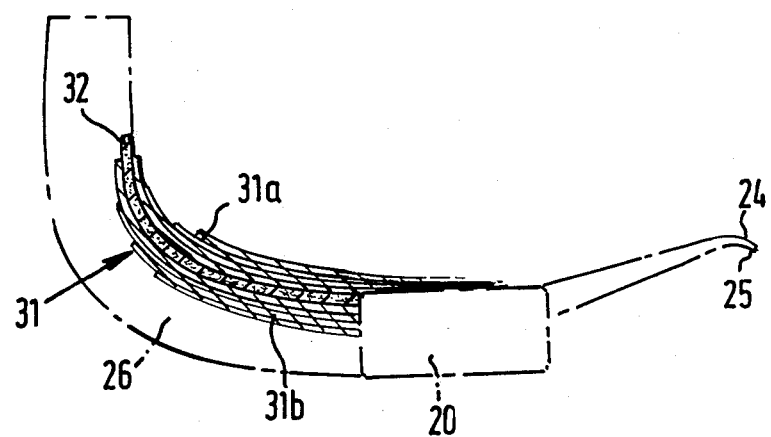
FIG. 4 is a section through the seat showing the diaphragm and nose portion.

Spanning the seat widthwise between the seat supports 26 is a seat diaphragm 31 that is stiffened with a panel 32 of polyimide or acrylic structural foam and is skinned with carbon fibre material on both its upper and lower faces. It will be appreciated that the diaphragm follows the profile of the seat supports 26 and can be substantially rigid and self-supporting. But the seat diaphragm rigidity can be varied from stiff to flexible depending on whether the laminate is single ply or multi-ply or core-reinforced multi-ply. Thus the seat diaphragm can comprise a plurality of laminates 31a, 31b (FIG. 4) on the upper and lower faces of the panel 32 which are staggered to act as a multi-leaf spring. The combined core and leaf spring structure of the diaphragm 31 gives a degree of flexibility so that the seat can respond to movement of the occupant for maximum comfort combined with useful energy attentuation properties under abnormal loads. A front or nose portion 24 of the seat extends forwardly and upwardly from the spar 20 and terminates at a downwardly curved front edge 25. It is defined by a shaped core of structural foam and by upper and lower resin reinforced carbon fibre skins. Its maximum depth at a point where it is attached cantilever-wise to the spar 20 is less than half of that of the spar 20 and it is of constant, forwardly tapering section. The provision of an upwardly directed front portion 24 as permitted by the present integrally moulded seat pan structure adds support to the seat and helps prevent the occupant from slipping out of the seat when the backrest 41 of the seat is reclined. In a heavy down-load situation the front portion 24 deforms with flexion of its upper skin and compression or buckling of its lower skin and thereby attentuates energy, but complete collapse of the front portion 24 still leaves the main load-bearing structure unaffected.

Figure 3:
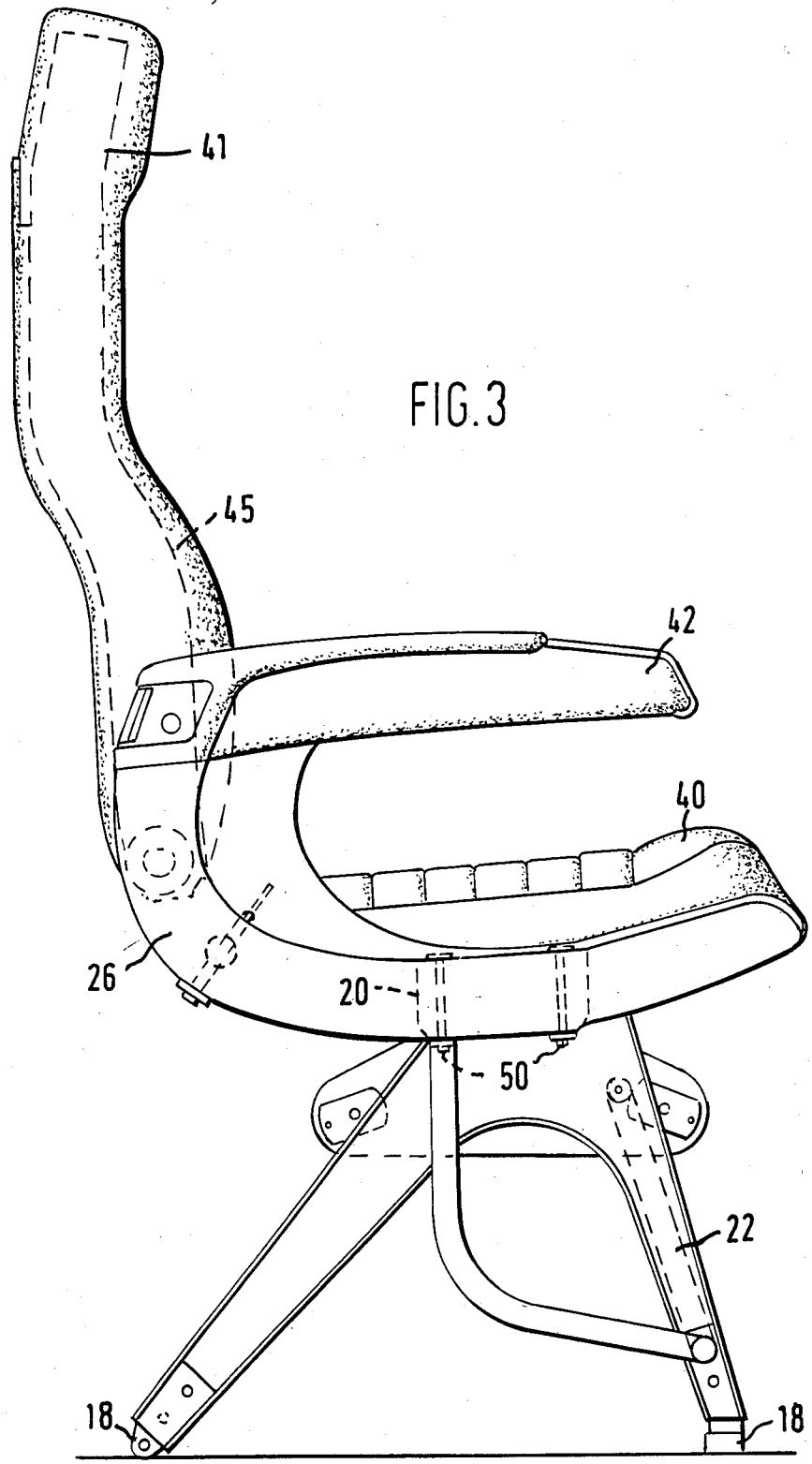
FIG. 3 is a side view of an assembled seat according to the invention.

The seat supports 26, spar 20, front portion 24 and diaphragm 31 are assembled with the resin pre-impregnated material in an uncured state and the assembly is then cured in an autoclave at about 120°–180° C. to unite them into a unitary structure in which loads on the seat frame members 26 are transmitted through the spar 20 to the legs 22 which are bolted together by vertically directed bolts 50 (FIG. 3). The arrangement illustrated in FIG. 1 is for a two seat floor and sidewall fixing unit and in FIG. 3 is for a single sidewall fixing window seat and it will be appreciated that the number of places provided may be altered by lengthening or shortening the spar 20 and adding or removing seat supports 26 and legs 22. Thus a three-place centre seat for a wide bodied aircraft can have four frame members 26 and be supported from the floor by means of a pair of laterally spaced legs 22. The seat pan assembly defined by front portion 24, spar 20, frame members 26 and diaphragm 31 presents an uninterrupted top surface that is easy to clean. The spar 20 is at a higher position than when separate seat webbing is used which is advantageous from the space saving standpoint. Furthermore, in the event of failure of the non-structural nose-portion 24 and diaphragm 31 in a heavy download situation, an occupant of the seat impacts the flat spar 20 and not a curved metal spar as in Patent Specification No. GB-A-2022403 which is much more likely to give rise to injury.

The leg 22 is generally of inverted U-shape in side view and is constituted by a horizontal limb 10 from which depend a front leg 12 and a rear leg 14. The horizontal limb 10 is formed in its top face with a recess 16 for the seat spar 20. The leg is of generally I-section throughout and is made up of a core of foamed aluminium or Nomex honeycomb of acrylic or polyimide structural foam faced with resin bonded carbon fibre mouldings of channel section. The underside and the front and rear faces of the leg 22 are capped with capping strips also of resin bonded carbon fibre. The parts of the leg 22 are assembled together and then cured as a unit in an autoclave. The lower ends of legs 12, 14 are provided with locating blocks 18 to take pins that fit in the aircraft floor track to hold the leg assembly in position. It is an advantage of the present construction that the leg 22 can be located anywhere along the spar 20 because of the constant profile thereof, the underside of the seat being plain and free from obstruction.

In FIG. 3 it may be noted that seat cushions 40 of shaped foamed plastics material fit onto the diaphragm 31. Backrests 41 are pivotally fixed between stub posts 29 and may be supported in upright or inclined attitudes by conventional means. The backrest 41 may also comprise a rigid surround of box-section skin and core carbon fibre reinforced plastics and a diaphragm 45 moulded integrally with the surround. In that case the back diaphragm 45 may in the assembled seat overlap with the seat diaphragm 31 so that the occupant of the seat is isolated by rigid diaphragm material from the row of seats behind him. Arm rests 42 are provided in conventional manner.

It will be appreciated that the seat of the invention is light in weight but very strong and is assembled from only a few components. The spar 20 is located well forward and at an elevated position and presents a flat surface to a seat occupant, thereby minimizing the risk of injury from sudden vertical loads.

It will also be appreciated that modifications may be made to the embodiment described above without departing from the invention the scope of which is defined in the appended claims.

I claim:

1. A seat frame assembly for an aircraft seat comprising a single laterally extending spar, at least one leg assembly to support the spar from the aircraft floor, a plurality of generally J-shaped seat supports extending from one side of the spar at laterally spaced locations with their cranked rear ends directed upwardly to locate pivoting seat backs and seat cushion support means between the or each pair of seat supports, characterised in that:
   (a) the seat supports extend unilaterally from the spar, and the spar and seat supports are formed with a skin of carbon fibre reinforced plastics and reinforcing cores of expanded material that prevent buckling of the spar and seat supports under load;
   (b) the spar is of generally rectangular section with its width greater than its depth to present a flat upper surface;
   (c) the apex of the or each leg assembly is formed with a cut-out in which the spar is located; and
   (d) the seat cushion support means is a diaphragm supported upon the spar and the seat supports.

2. An assembly according to claim 1, wherein the cores are of rigid heat-resistant foamed plastics material.

3. An assembly according to claim 1, wherein the cores are of a material of honey-comb construction.

4. An assembly according to claim 1, wherein the diaphragm is of rigid material formed integrally with the seat supports and spar and upwardly curved at its rear end in conformity with the shape of the J-tubes.

5. An assembly according to claim 4, wherein the seat back also has a diaphragm of rigid material and extended length that in the assembled condition overlaps with the seat pan diaphragm so that the seat is isolated from the row of seats behind.

6. An assembly according to claim 5, wherein a pad of reinforcing material is moulded into the diaphragm in its upwardly curved rear end region.

7. An assembly according to claim 6, wherein the seat cushion support means further comprises a front portion of curvilinear profile cantilevered forwardly and upwardly from the front upper edge of the spar and presenting a continuous upper surface therewith.

8. An assembly according to claim 7, wherein the seat supports, spar and diaphragm are assembled from green resin-impregnated carbon fibre material and autoclaved at not more than 400° C. to cure the resin and form a rigid unitary structure.

9. An assembly according to claim 8, wherein the or each leg is formed from carbon fibre reinforced plastics material and is generally of I-section with the web portion of the I consisting of a core faced with carbon fibre reinforced plastics.

10. An assembly according to claim 9, wherein the core is of rigid heat-resistant plastics material.

11. An assembly according to claim 1, further comprising a seat cushion sitting directly on the diaphragm.

12. A combined seat frame and cushion support for an aircraft seat comprising a single laterally extending spar of non-circular cross-section presenting a flat upper surface and formed from a core of expanded material and a skin of carbon fibre reinforced plastics, a plurality of rearwardly extending seat supports of carbon fibre reinforced plastics material secured to the spar at laterally spaced locations, a seat cushion support diaphragm on and spanning between the seat supports and the spar and of a profile defined by the seat supports, and one or more legs with each leg being formed at its apex with a recess in which the spar is located and rigidly secured.

13. A combined seat frame and cushion support for an aircraft seat comprising an integrally moulded structure in carbon fibre including a spar presenting a flat upper surface, rearwardly facing J-shaped seat supports secured to the spar at laterally spaced locations, a diaphragm spanning between the seat supports to define an uninterrupted top surface with the spar and cantilevered therefrom to deform elastically in respose to the normal weight of an occupant and to undergo progressive inelastic deformation with energy absorption in response to a heavy down load, and a front portion of curvilinear profile cantilevered forwardly and upwardly from the spar with which it also defines an uninterrupted top surface and terminated in a downwardly curved nose, said front portion also undergoing progressive inelastic deformation with energy absorption in response to a heavy down load.

* * * * *